(No Model.)

P. H. INGRAHM, Dec'd.,
F. INGRAHM, Administratrix.
VEHICLE BRAKE.

No. 310,518. Patented Jan. 6, 1885.

Witnesses,
Henry Marsh.
John P. C. Prinkert

Inventor,
Philo H. Ingrahm
by Crosby & Gregory
attys.

UNITED STATES PATENT OFFICE.

PHILO H. INGRAHM, OF MARATHON, NEW YORK; FANNY INGRAHM ADMINISTRATRIX OF SAID PHILO H. INGRAHM, DECEASED.

VEHICLE-BRAKE.

SPECIFICATION forming part of Letters Patent No. 310,518, dated January 6, 1885.

Application filed January 23, 1884. (No model.)

*To all whom it may concern:*

Be it known that I, PHILO H. INGRAHM, of Marathon, county of Cortland, State of New York, have invented an Improvement in Vehicle-Brakes, of which the following description, in connection with the accompanying drawings, is a specification, like letters on the drawings representing like parts.

This invention relates to vehicle-brakes, particularly to that class known as "front-wheel gear-brakes."

The object of my invention is to provide a brake of a strong yet simple construction, which can be applied to the front wheels of an ordinary four-wheeled vehicle, and which shall be under the control of the driver and be easily operated by him to brake the wheels when necessary.

To this end my invention consists, primarily, of the combination, with the pole, front axle, and hound of an ordinary four-wheeled vehicle, of a brake-bar held to the hound and capable of lateral movement, a lever pivoted to the pole, and a pair of intermediate levers secured to the axle, and provided with suitable connecting-rods to attach them to the brake-bar, and an operating-lever, substantially as hereinafter described, and particularly pointed out in the claim.

Figure 1:
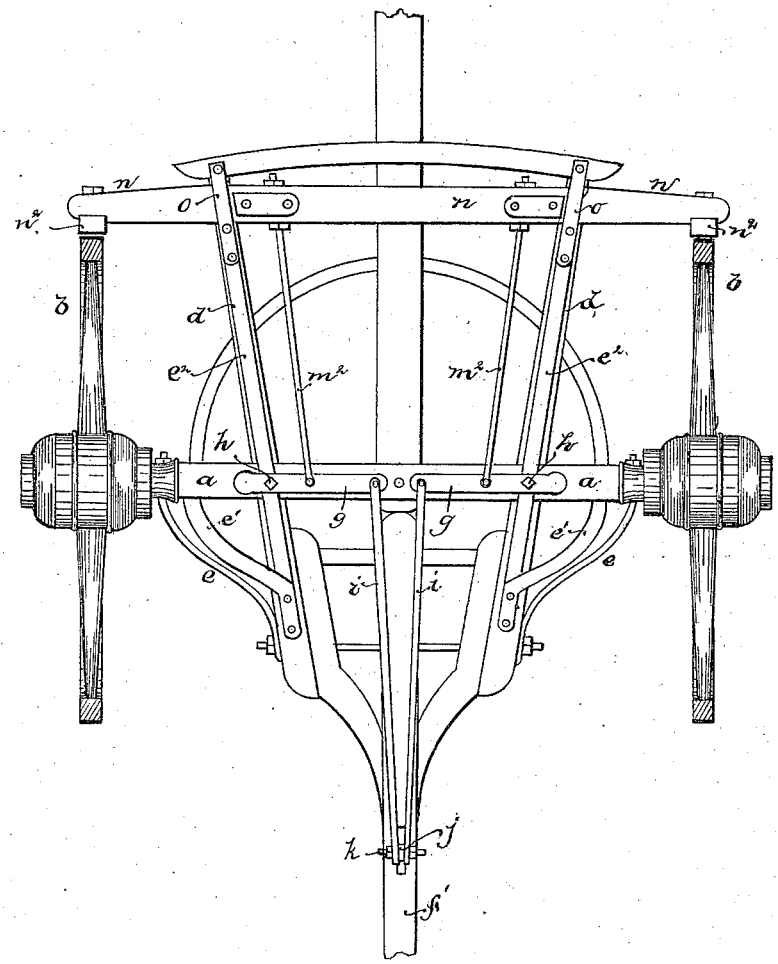
Figure 2:
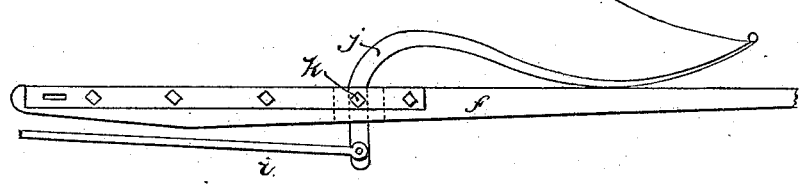

Figure 1 is a plan view of the under side of the front gear of an ordinary four-wheeled vehicle with my improved brake applied thereto. Fig. 2 is a side elevation of the pole with the bent lever pivoted thereon, the pole being right side up.

The axle $a$, wheels $b$, hound $d$, iron braces $e$ $e'$ $e^2$, and pole $f'$ are of ordinary construction.

In accordance with my invention I place two levers, $g$, at the under side of the axle $a$, the said levers having their fulcra on bolts $h$, which are passed successively from the lap down through the usual front sand-board, (not shown,) but commonly used over and parallel with the front axle, then through the hound $d$, axle $a$, iron braces $e^2$, and lever $g$, where they receive each a nut to secure the bolts and hold the parts in place. The iron braces $e^2$ may be re-enforced about the hole through which the bolts $h$ pass, to provide against weakness at that point. The bolts $h$ pass through the levers $g$ near the outer ends thereof, and said levers are arranged in line with the axle, and have their inner ends near the center of said axle. Two connecting-rods, $i$, are fastened to the inner ends of the levers $g$, and, projecting forward, are secured to the shorter arm of a bent lever, $j$, having its fulcrum on a pin or bolt, $k$, in a mortise made in the pole $f$, the longer arm of said lever being disposed at one end in line with said pole, and receiving at its end a strong cord, $m$, said cord being within reach of the driver. Two other connecting-rods, $m^2$, are fastened to the levers $g$ at a point between their inner ends and the bolts $h$, and are also fastened to a brake-bar, $n$, which is disposed in rear of the axle $a$, the said brake-bar being loosely held on the hound $d$ by means of the metal loops, $o$, fastened to said hounds, the said loops being of sufficient length to permit lateral movement of the brake-bar therein toward and from the wheels. The brake-bar $n$ is provided with blocks $n^2$, to engage the tires of the wheels when the brake is applied by the driver.

To apply the brake it is only necessary to raise the longer arm of the bent lever $j$ by the cord $m$, which will cause the said lever to swing on its pivot and carry its shorter arm forward, which forward movement will be communicated through the rods $i$ to the levers $g$, and in turn through the rods $m^2$ to the brake-bar $n$, whereupon the blocks $n^2$ of the said brake-bar will be brought against the tire of the wheels $b$ to brake said wheels. The weight of the longer arm of the bent lever $j$ is sufficient to keep the brake-blocks out of engagement with the wheels.

I claim—

The combination of the pole provided with the bent lever $j$, extended along and resting on the tongue $f$, and having the operating-cord $m$ attached to the end of the lever and within reach of the driver, the axle having the lever $g$ fulcrumed to the under side thereof, the hounds provided with the brake-bar, secured thereto by the metal loops $o$, the rod $i$, connecting the levers $g$ and $j$, and the rods $m^2$, attached to the levers $g$ between their fulcrum and the rods $i$, and connecting said levers $g$ and the brake-bar, substantially as shown and described, and for the purposes set forth.

In testimony whereof I have signed my name to this specification in the presence of two subscribing witnesses.

PHILO H. INGRAHM.

Witnesses:
W. E. STOCKWELL,
WM. A. STOCKWELL.